United States Patent
Bauerle et al.

(10) Patent No.: US 6,182,002 B1
(45) Date of Patent: Jan. 30, 2001

(54) VEHICLE ACCELERATION BASED TRACTION CONTROL

(75) Inventors: Paul Alan Bauerle, Fenton; Stephen E. Colby, Grand Ledge, both of MI (US)

(73) Assignee: General Motors Corporation, Detroit, MI (US)

( * ) Notice: Under 35 U.S.C. 154(b), the term of this patent shall be extended for 0 days.

(21) Appl. No.: 09/178,791

(22) Filed: Oct. 26, 1998

(51) Int. Cl.$^7$ .................. G06F 7/00; B60T 7/12
(52) U.S. Cl. .................. 701/82; 701/70; 701/84; 701/90; 303/139; 303/113.2; 180/197; 290/40 R; 477/186; 477/187
(58) Field of Search .................. 701/82, 70, 74, 701/79, 84, 85, 90, 83; 303/162, 185, 140, 146, 122, 113.2, 138, 139; 180/197, 248, 249; 290/40 R, 40 A, 40 B, 40 C, 45, 51; 477/185, 186, 187, 182, 183

(56) References Cited

U.S. PATENT DOCUMENTS

| | | | |
|---|---|---|---|
| 4,188,075 | * 2/1980 | Rajput et al. | 303/106 |
| 4,946,015 | * 8/1990 | Browalski | 477/186 |
| 5,004,064 | * 4/1991 | Tezuka et al. | 180/197 |
| 5,009,279 | * 4/1991 | Matsuda | 180/197 |
| 5,102,203 | * 4/1992 | Tierney | 303/93 |
| 5,329,453 | * 7/1994 | Tsuyama et al. | 791/83 |
| 5,431,242 | * 7/1995 | Iwata et al. | 180/197 |
| 5,492,192 | 2/1996 | Brooks et al. | 180/165 |
| 5,559,703 | * 9/1996 | Iwata et al. | 701/86 |
| 5,636,909 | * 6/1997 | Hirao et al. | 303/140 |
| 5,667,286 | 9/1997 | Hoying et al. | 303/140 |
| 5,686,662 | 11/1997 | Tracht et al. | 73/121 |
| 5,696,683 | * 12/1997 | Schafer et al. | 701/90 |
| 5,762,407 | 6/1998 | Stacey et al. | 303/155 |
| 5,852,330 | * 12/1998 | Yumoto | 290/40 R |
| 5,867,803 | * 2/1999 | Kim et al. | 701/85 |
| 5,957,991 | * 9/1999 | Yasuda | 701/84 |
| 6,078,859 | * 6/2000 | Jastrzebski et al. | 701/93 |

* cited by examiner

Primary Examiner—Jacques H. Louis-Jacques
(74) Attorney, Agent, or Firm—Christopher DeVries

(57) ABSTRACT

An improved traction control system in which a wheel spin condition is detected based on measured vehicle acceleration instead of measured wheel speeds. An electronic controller detects a wheel spin condition by computing the acceleration of the vehicle drive shaft and comparing the computed acceleration to an acceleration threshold stored as function of vehicle speed and wheel torque. If the computed acceleration exceeds the threshold for more than a predetermined time, the engine torque is reduced in relation to the amount by which the computed acceleration exceeds the threshold. When the computed acceleration falls below the threshold, the torque reduction is gradually removed. The wheel torque, vehicle speed and drive shaft acceleration are easily determined and filtered, and the incremental cost of the traction control function is primarily related to the memory requirements to accommodate the acceleration threshold look-up table. The control may be mechanized in a vehicle having electronic throttle control, and the desired torque reduction in such a mechanization may be achieved with one or more of throttle area control, spark timing control and fuel cutoff control.

10 Claims, 2 Drawing Sheets

VEHICLE ACCELERATION BASED TRACTION CONTROL

This invention relates to vehicle traction control systems that reduce torque at the vehicle wheels in response to a detected wheel spin condition.

BACKGROUND OF THE INVENTION

Automotive traction control systems have been developed as a stability enhancement feature, and operate to reduce wheel torque in response to a detected wheel spin condition. A number of control variables have been utilized to carry out the torque reduction, including engine fuel reduction, engine spark retard, engine throttle control, and brake controls. In general, detection of the wheel spin condition is achieved by precisely monitoring the speeds of the driven wheels and comparing them with the speeds of un-driven wheels or a vehicle reference speed.

The incremental cost of providing a traction control function is minimized in vehicles having an anti-lock brake system since the required wheel speed and reference speed information is available at little or no additional cost. However, the incremental cost of traction control is much higher in vehicles where anti-lock brake system inputs and variables are not available. Accordingly, it is desired to provide a traction control system that does not require high resolution wheel speed sensors, and yet can be made available at a small incremental cost.

SUMMARY OF THE INVENTION

The present invention is directed to an improved traction control system in which a wheel spin condition is detected based on measured vehicle acceleration instead of measured wheel speeds. According to the invention, an electronic controller detects a wheel spin condition by computing the acceleration of the vehicle drive shaft and comparing the computed acceleration to an acceleration threshold stored as function of vehicle speed and wheel torque. If the computed acceleration exceeds the threshold for more than a predetermined time, the engine torque is reduced in relation to the amount by which the computed acceleration exceeds the threshold. When the computed acceleration falls below the threshold, the torque reduction is gradually removed.

The wheel torque, vehicle speed and drive shaft acceleration are easily determined and filtered, and the incremental cost of the traction control function is primarily related to the memory requirements to accommodate the acceleration threshold look-up table. In the illustrated embodiment, the control is mechanized in a vehicle having electronic throttle control, and the desired torque reduction is achieved with throttle area control, spark timing control and fuel cutoff control.

DETAILED DESCRIPTION OF THE DRAWINGS

Figure 1:
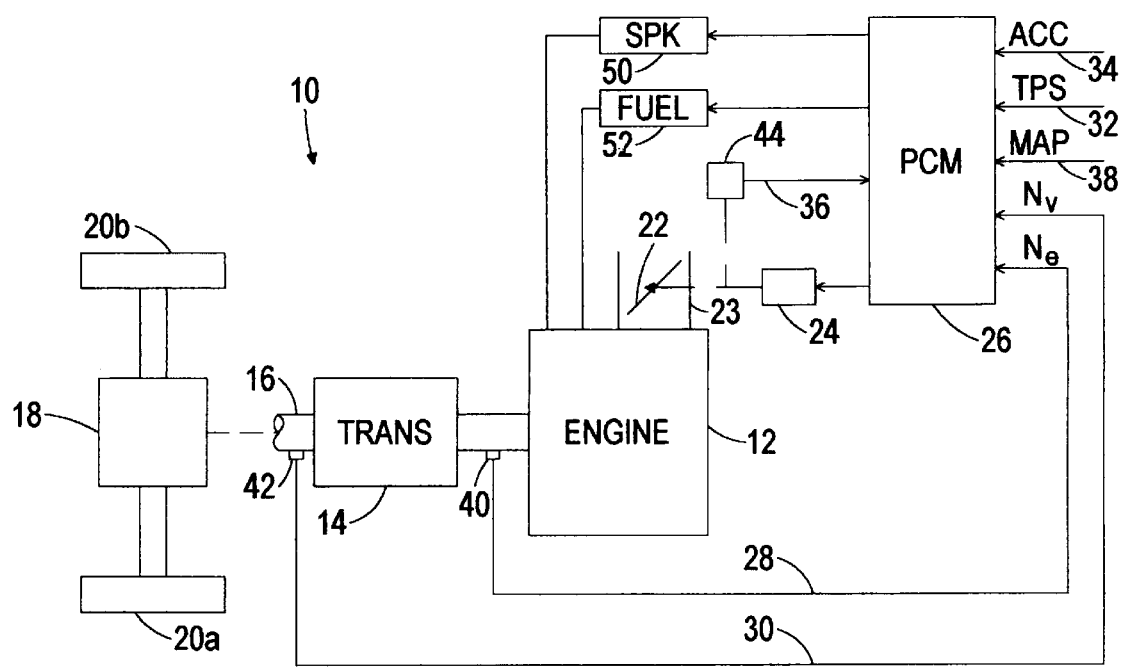
FIG. 1 is a schematic diagram of a vehicle having an acceleration based traction control system according to this invention, including an electronic control unit.

Referring to the drawings, and particularly to FIG. 1, the reference numeral 10 generally designates a vehicle drive train including an engine 12 coupled to a multiple-speed ratio transmission 14, which in turn is coupled via drive shaft 16 and differential 18 to a pair of driven wheels 20a–20b. The position of a throttle 22 disposed within a manifold 23 of engine 12 is controlled to produce the desired output torque for driving the wheels 20a–20b. In the illustrated embodiment, the throttle 22 is mechanically de-coupled from the driver accelerator pedal (not shown) and instead is positioned by an electric motor 24 under the control of a powertrain control module (PCM) 26, which also controls the operation of engine 12 and transmission 14. The PCM 26 is microprocessor based, and operates in response to a number of inputs, including an engine speed signal $N_e$ on line 28, a vehicle speed signal $N_v$ on line 30, an accelerator position signal TPS on line 32, an accessory loading signal ACC on line 34, a throttle position feedback signal on line 36, and a manifold absolute pressure MAP signal on line 38. These inputs are provided by various conventional sensors such as the illustrated shaft speed sensors 40, 42 and throttle position sensor 44. In general, the PCM 26 activates motor 24 to position the throttle 22 in response to accelerator pedal movement, but various other functions such as idle speed control, engine governor control, cruise control, and torque reduction for traction control are also provided. Additionally, the PCM 26 controls conventional spark and fuel control devices 50, 52 coupled to engine 12.

According to this invention, the PCM 26 detects wheel spin when the acceleration of drive shaft 16 exceeds a threshold acceleration determined as function of the powertrain output torque (also referred to herein as wheel torque) and vehicle speed. When wheel spin is detected, PCM 26 determines a desired torque reduction for reducing or substantially eliminating the wheel spin, and the torque reduction is carried out through the control of motor 24, and the spark and fuel control devices 50 and 52. Other controls, such as brake control of the wheels 20a, 20b may also, or alternatively, be used if desired. Accordingly, it should be apparent that although the illustrated embodiment includes electronic throttle control, such functionality is not necessary to the practice of this invention.

Figure 2:
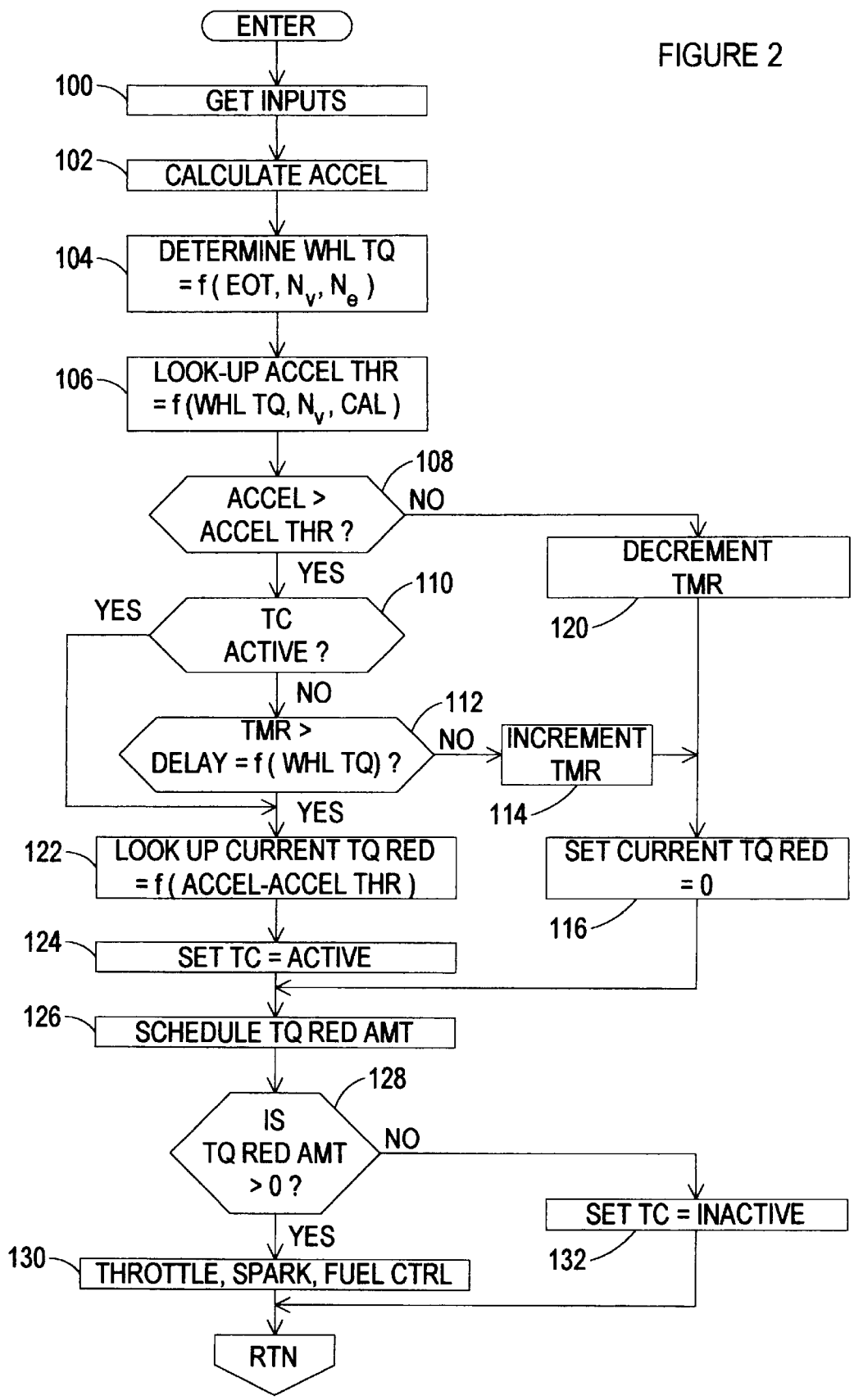
FIG. 2 is a flow diagram representative of computer program instructions executed by the electronic control unit of FIG. 1 in carrying out the traction control of this invention.

The control of this invention is best described in reference to the flow diagram of FIG. 2, which represents a software routine periodically executed by PCM 26. Initially, block 100 is executed to read various input signals such as engine speed $N_e$, transmission output speed $N_v$, and to obtain the current value of engine output torque, or brake torque, EOT, which is customarily determined based on spark, fuel and other parameters for purposes of engine control. Block 102 then calculates the acceleration of drive shaft 16 based on a series of two or more vehicle speed readings; in practice a least squares calculation based on the past six readings was found to provide a suitably smooth acceleration value with minimal lag. Block 104 then determines the wheel torque (WHL TQ) by determining the N/V ratio (that is, $N_e/N_v$) and obtaining the product of the N/V ratio and the engine output torque (EOT).

Block 106 determines an acceleration threshold (ACCEL THR) based on output speed $N_v$ and the determined wheel torque WHL TQ. The value of ACCEL THR is preferably determined by table look-up, the table being constructed based on empirically derived values of maximum achievable acceleration for various combinations of wheel torque and output speed on dry pavement, and then offset by a calibration factor CAL having a value greater than one so as to reflect acceleration levels that would not ordinarily be achievable without wheel spin. Alternatively, the calibration factor CAL could be incorporated into the table values.

If the computed acceleration ACCEL exceeds the determined threshold ACCEL THR, as determined at block 108, and traction control (TC) is not already active, as determined at block 110, block 112 is executed to compare the value of a software timer TMR with a delay value DELAY determined as a function of the wheel torque WHL TQ. Initially, the timer TMR has a value of zero, and the blocks 114–116 are executed to increment timer TMR and to set the current torque reduction to zero. Conversely, the block 120 operates to decrement the timer TMR if the calculated acceleration ACCEL falls below the threshold ACCEL THR. However, if the calculated acceleration ACCEL remains above the threshold ACCEL THR, and the timer TMR exceeds the delay value DELAY, the blocks 122–124 are executed to determine a current torque reduction value (which may be characterized as a percent torque reduction) as a function of the amount by which the calculated acceleration ACCEL exceeds threshold ACCEL THR, and to indicate that traction control (TC) is active.

The purpose of the delay value DELAY is to compensate for the fact that wheel torque WHL TQ, which is used to determine the acceleration threshold ACCEL THR, leads the computed acceleration ACCEL. In general, the delay value DELAY is relatively long when the wheel torque WHL TQ is small in order to inhibit traction control if the driver releases the accelerator pedal. Conversely, the delay value DELAY is relatively short when the wheel torque WHL TQ is large so as to provide quick response in situations where wheel spin is more likely. Alternatively, or additionally, the control may compensate for the diverse latencies of WHL TQ and ACCEL by storing several of the most recent WHL TQ values in a shift register, and choosing which of the values to use for the table look-up of ACCEL THR based on a calibration or on the magnitude of the newest value.

Finally, blocks 126 and 130 schedule a torque reduction amount based on the current torque reduction value, and carry out a torque reduction in accordance with the scheduled amount by suitably controlling one or more of throttle position, spark advance and fuel. If desired, the scheduling of the torque reduction amount at block 126 can be carried out with a simple first order filter that takes into account the current and previous (if any) torque reduction amounts so that the filter output quickly follows increases in the current torque reduction, and gradually falls off after block 116 sets the current torque reduction to zero. A simple example of such a filter is given by the equation:

$$STRA = STRA(last) + G[CTR - STRA(last)]$$

where STRA is the scheduled torque reduction amount, STRA(last) is the previous scheduled torque reduction amount, CTR is the current torque reduction, and G is a gain term having a value of one when traction control is active and less than one when traction control is inactive. When the scheduled torque reduction amount reaches zero, as determined at block 128, the block 132 is executed to indicate that traction control (TC) is inactive.

In summary, the PCM 26 detects wheel spin when the determined drive shaft acceleration exceeds a speed and output torque dependent acceleration threshold for at least a determined delay time. Once wheel spin is detected, a torque reduction amount is determined as a function of the amount by which the acceleration exceeds the threshold. When the acceleration then falls below the threshold, the current torque reduction amount is set to zero, and the scheduled torque reduction is gradually phased out. If the acceleration rises above the threshold before the scheduled torque reduction has been reduced to zero, a wheel spin condition is recognized without regard to the delay time, since traction control (TC) is still active.

With the above-described control, high resolution wheel speed sensors are not required, and the control is easily and economically implemented in a vehicle that does not have such sensors. While this invention has been described in reference to the illustrated embodiment, it is expected that various modifications in addition to those suggested above will occur to those skilled in the art. In this regard, it will be understood that the scope of this invention is not limited to the illustrated embodiment, and that controls incorporating such modifications may fall within the scope of this invention, which is defined by the appended claims.

What is claimed is:

1. A motor vehicle traction control system in which an electronic controller operates in response to a detected wheel spin condition to reduce wheel torque in accordance with a commanded torque reduction amount for improved traction, the improvement wherein:

the controller determines an acceleration and an output torque of the vehicle, compares the determined acceleration to an acceleration threshold based on vehicle speed and the determined output torque, and detects a wheel spin condition when the determined acceleration exceeds the acceleration threshold for at least a determined delay time; and the commanded torque reduction amount is determined in accordance with an amount by which the determined acceleration exceeds the acceleration threshold.

2. The improvement of claim 1, wherein the acceleration threshold is representative of an acceleration higher than the vehicle could achieve without wheel spin.

3. The improvement of claim 1, wherein the delay time is determined as a function of the determined output torque of the vehicle, and compensates for a difference in response times of the determined acceleration and the determined output torque.

4. The improvement of claim 3, wherein the delay time decreases with increasing values of the determined output torque.

5. A motor vehicle traction control method comprising the steps of:

computing an acceleration and an output torque of the vehicle;

determining an acceleration threshold based on vehicle speed and the computed output torque, the acceleration threshold representing an acceleration higher than the vehicle could achieve without wheel spin;

detecting a wheel spin condition when the computed acceleration exceeds the determined acceleration threshold for at least a determined delay time; and in response to a detected wheel spin condition, reducing a wheel torque of the vehicle in relation to a difference between the computed acceleration and the determined acceleration threshold for improved traction of the vehicle.

6. The traction control method of claim 5, wherein the step of detecting a wheel spin condition comprises the steps of:

incrementing a timer when the computed acceleration exceeds the determined acceleration threshold, and decrementing the timer when the computed acceleration is below the determined acceleration threshold; and detecting a wheel spin condition when the timer has a value that exceeds a delay value determined as a function of the computed output torque of the vehicle.

7. The traction control method of claim 5 wherein the wheel torque reduction is progressively removed when the computed acceleration falls below the determined acceleration threshold, and the wheel spin condition is re-detected without regard to the determined delay time if the computed acceleration rises above the acceleration threshold before the wheel torque reduction is fully removed.

8. The traction control method of claim 5, including the steps of:

- storing a plurality of successively computed output torques; and
- selecting one of said stored output torques for the determination of said acceleration threshold so as to compensate for a lag of said computed acceleration relative to said computed output torque.

9. A motor vehicle traction control method comprising the steps of:

- computing an acceleration and an output torque of the vehicle;
- storing a plurality of successively computed output torques;
- selecting one of said stored output torques so as to compensate for a lag of said computed acceleration relative to said computed output torque, and determining an acceleration threshold based on vehicle speed and the selected output torque, the acceleration threshold representing an acceleration higher than the vehicle could achieve without wheel spin;
- detecting a wheel spin condition when the computed acceleration exceeds the determined acceleration threshold; and
- in response to a detected wheel spin condition, reducing a wheel torque of the vehicle in relation to a difference between the computed acceleration and the determined acceleration threshold for improved traction of the vehicle.

10. The traction control method of claim 9, wherein the step of detecting a wheel spin condition includes the steps of:

- incrementing a timer when the computed acceleration exceeds the determined acceleration threshold, and decrementing the timer when the computed acceleration is below the determined acceleration threshold; and
- detecting a wheel spin condition when the timer has a value that exceeds a delay value determined as a function of the computed output torque of the vehicle.

* * * * *